(12) United States Patent
Van Heerden

(10) Patent No.: US 9,879,947 B2
(45) Date of Patent: Jan. 30, 2018

(54) HIGH DENSITY, HIGH DRY-RESIN CONTENT FABRIC FOR RIGID COMPOSITE BALLISTIC ARMOR

(71) Applicant: Barrday Corp., Charlotte, NC (US)

(72) Inventor: Jason Van Heerden, Cambridge (CA)

(73) Assignee: BARRDAY, INC. (CA)

( * ) Notice: Subject to any disclaimer, the term of this patent is extended or adjusted under 35 U.S.C. 154(b) by 111 days.

(21) Appl. No.: 14/761,318

(22) PCT Filed: Jan. 16, 2014

(86) PCT No.: PCT/US2014/011828
§ 371 (c)(1),
(2) Date: Jul. 16, 2015

(87) PCT Pub. No.: WO2014/163727
PCT Pub. Date: Oct. 9, 2014

(65) Prior Publication Data
US 2015/0354925 A1 Dec. 10, 2015

Related U.S. Application Data

(60) Provisional application No. 61/753,404, filed on Jan. 16, 2013.

(51) Int. Cl.
*F41H 5/04* (2006.01)
*B32B 5/02* (2006.01)
(Continued)

(52) U.S. Cl.
CPC .......... *F41H 5/0485* (2013.01); *B32B 5/024* (2013.01); *B32B 5/12* (2013.01); *B32B 5/26* (2013.01);
(Continued)

(58) Field of Classification Search
CPC ..................................................... F41H 5/0485
(Continued)

(56) References Cited

U.S. PATENT DOCUMENTS

| 4,714,642 A | 12/1987 | McAliley |
| 5,160,776 A | 11/1992 | Li |

(Continued)

FOREIGN PATENT DOCUMENTS

| EP | 2133650 | 12/2009 |
| WO | WO2008061170 | 5/2008 |

OTHER PUBLICATIONS

European Search Report for European Patent Application No. 14779578 completed Jul. 13, 2016.
(Continued)

*Primary Examiner* — Brent O'Hern
(74) *Attorney, Agent, or Firm* — Carlson, Gaskey & Olds, P.C.

(57) ABSTRACT

A ballistic composite armor article includes a multi-layer hard armor sheet that has at least first and second unidirectional yarn monolayers. The second unidirectional yarn monolayer is transversely oriented with respect to the first unidirectional yarn monolayer, and there is at least one polymeric binder layer arranged adjacent to and stabilizing at least one of the first and second unidirectional yarn monolayers. The yarns of the first and second unidirectional yarn monolayers include respective fiber bundles that have a lateral spread factor ranging from negative lateral spread to a positive lateral spread of less than 306%.

14 Claims, 6 Drawing Sheets

(51) Int. Cl.
    *B32B 5/26*      (2006.01)
    *B32B 5/12*      (2006.01)
(52) U.S. Cl.
    CPC ..... *B32B 2262/101* (2013.01); *B32B 2305/07* (2013.01); *B32B 2571/02* (2013.01); *Y10T 428/24124* (2015.01)
(58) Field of Classification Search
    USPC ........................................................ 428/113
    See application file for complete search history.

(56) References Cited

U.S. PATENT DOCUMENTS

| | | |
|---|---|---|
| 6,990,886 B2 | 1/2006 | Citterio |
| 7,407,900 B2 | 8/2008 | Cunningham |
| 2005/0197020 A1 | 9/2005 | Park |
| 2012/0189804 A1* | 7/2012 | Chiou ...................... B32B 5/08 428/113 |

OTHER PUBLICATIONS

International Preliminary Report on Patentability for PCT Application No. PCT/US2014/011828, dated Jul. 30, 2015.
International Search Report for PCT Application No. PCT/US2014/011828 completed Aug. 21, 2014.

\* cited by examiner

HIGH DENSITY, HIGH DRY-RESIN CONTENT FABRIC FOR RIGID COMPOSITE BALLISTIC ARMOR

CROSS-REFERENCE TO RELATED APPLICATION

This application claims priority to U.S. Provisional Application Ser. No. 61/753,404 filed on Jan. 16, 2013.

BACKGROUND

This disclosure relates to ballistic armor that is designed to protect against ballistic projectiles.

Composite ballistic armor systems, whether for helmets, small arms protective inserts, vehicle armor or structural protective armor, utilize high performance yarns to reduce weight, enhanced ballistic performance, and reduce cost. Traditionally, better ballistic performance has also been achieved through the use of resin-impregnated unidirectional fabrics rather than woven fabrics. These unidirectional (or orthogonal) constructions are typically either a 2-ply 0°/90° configuration, or a 4-ply 0°/90°/0°/90° configuration.

One resin-impregnated unidirectional fabric is a 4-ply construction that, depending on the way it is manufactured, has an overall areal density of 222 grams per square meter ($g/m^2$) up to 520 $g/m^2$. The areal density of the individual unidirectional monolayers used to make the 4-ply construction thus have an areal density of 55.5 $g/m^2$ to 130 $g/m^2$. Assuming a typical resin content, by weight of 12%-17%, each monolayer would have a fiber-only (yarn) areal density of less than 115 $g/m^2$. Forming a monolayer with a fiber-only areal density of less than 112 $g/m^2$ requires yarn spreading, as well as tight control over the spreading, to ensure a consistent fiber web, without voids or gaps between the individual spread yarns, across the product width.

SUMMARY

A ballistic composite armor article according to an example of the present disclosure includes a multi-layer hard armor sheet that has at least first and second unidirectional yarn monolayers. The second unidirectional yarn monolayer is transversely oriented with respect to the first unidirectional yarn monolayer, and there is at least one polymeric binder layer arranged adjacent to and stabilizing at least one of the first and second unidirectional yarn monolayers. The yarns of the first and second unidirectional yarn monolayers include respective fiber bundles that have a lateral spread factor ranging from negative lateral spread to a positive lateral spread of less than 306%.

In a further embodiment of any of the foregoing embodiments, the multi-layer hard armor sheet has, by weight, 20%-50% of the polymeric binder.

In a further embodiment of any of the foregoing embodiments, the individual fibers of the fiber bundles have a diameter (D), and the first and second unidirectional yarn monolayers have respective thicknesses that are each greater than 11D.

In a further embodiment of any of the foregoing embodiments, the fibers are organic fibers and the respective thicknesses are 11D to 23D.

In a further embodiment of any of the foregoing embodiments, the fibers are inorganic fibers and the respective thicknesses are 20D to 40D.

In a further embodiment of any of the foregoing embodiments, the fibers are inorganic fibers and the lateral spread factor ranges from −30% to 35%.

In a further embodiment of any of the foregoing embodiments, the yarns of the first and second unidirectional yarn monolayers have an axial twist of 0.5 to less than 20 turns per meter.

In a further embodiment of any of the foregoing embodiments, the yarns of the first and second unidirectional yarn monolayers have an axial twist of 0.5-4 turns per meter.

In a further embodiment of any of the foregoing embodiments, less than 20% of the fibers of the fiber bundles are in contact with the at least one polymeric binder layer.

In a further embodiment of any of the foregoing embodiments, less than 11% of the fibers of the fiber bundles are in contact with the at least one polymeric binder layer.

In a further embodiment of any of the foregoing embodiments, the one or more one polymeric binder layers include at least one first distinct polymeric binder layer between the first and second unidirectional yarn monolayers, and second and third distinct polymeric binder layers arranged at the respective opposite faces of the first and second unidirectional yarn monolayers from the at least one first distinct polymeric binder layer.

In a further embodiment of any of the foregoing embodiments, the at least one first distinct polymeric binder layer has a higher areal density than each of the second and third distinct polymeric binder layers.

In a further embodiment of any of the foregoing embodiments, the fibers are organic fibers.

In a further embodiment of any of the foregoing embodiments, the fibers are inorganic fibers.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
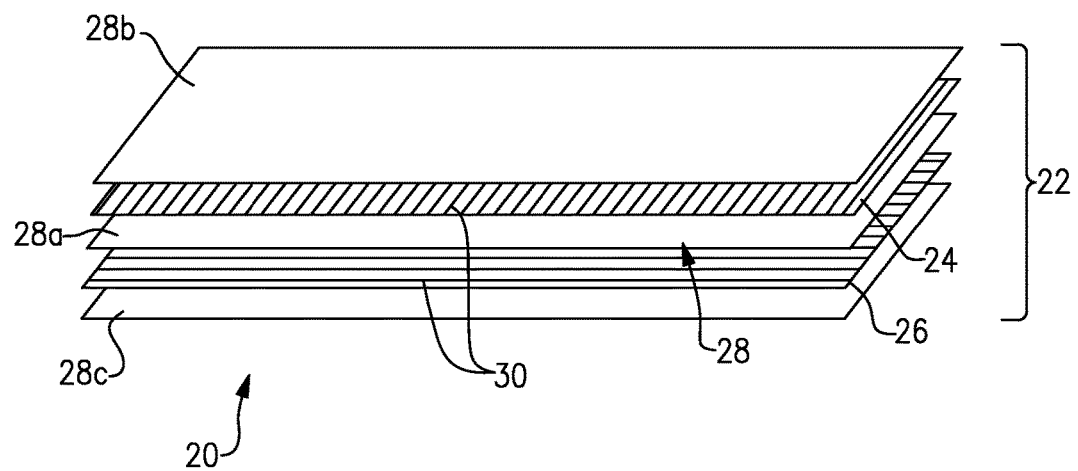
FIG. 1 illustrates an example ballistic composite armor article according to this disclosure.

When heavy weight armor panels are fabricated from resin-impregnated unidirectional fabrics, multiple layers of the unidirectional product are precession cut, laid-up and pressed to achieve a final required armor weight and/or thickness. The areal density of the final armor can vary widely from light, e.g., 1.0 pound per square foot (4.88 kg/m$^2$) for light-weight police shields, used to stop handgun rounds, to very heavy, e.g., 100 pounds per square foot (48.82 kg/m$^2$) armor used on vehicles to protect against explosively formed projectiles. For such armor panels, the manufacturing cost in terms of fabric handling, cutting, lay-up and pressing increases with the use of greater numbers of layers of unidirectional fabric needed to meet the armor target weight or thickness.

Generally, better ballistic performance, from unidirectional composite materials has been achieved through:
 a. using higher performing, higher tenacity, (usually finer denier) yarns in the unidirectional construction to increase energy absorption potential;
 b. highly spreading the individual yarn fiber bundles to make individual unidirectional monolayers thinner and thereby decrease areal density of a 4-ply 0°/90°/0°/90° configuration and thus increase the total number of ballistic layers within a set armor weight or thickness, which is more effective at dissipating the energy of a ballistic projectile; or
 c. reducing the dry-resin-content of the non-ballistic, low modulus, largely parasitic binding resin within the undirectional construction to thus increase the weight and fiber fraction of high-performance ballistic yarn in the armor and thus also increase the energy absorption potential.

A drawback to the above paradigms is that they typically result in an increase in unidirectional fabric cost and, in turn, a more expensive final composite ballistic armor product. However, under these paradigms, a sacrifice of greater fabrication cost is necessary in order to obtain an increase in performance. As will be described in further detail, the ballistic composite armor article disclosed herein represents a move away from the above paradigms.

In general, a ballistic armor is, for example, a protective material that is specifically designed to protect against ballistic projectiles (fragments and bullets) by dissipating their energy and resisting complete penetration.

Hard and Soft Armor:

Police, law enforcement agencies and military personnel wear two types of personal body protection. These can be broadly classified as "soft" and "hard" armor. Soft armors are relatively flexible and conform to the body contours of the wearer. Soft armors are designed primarily stop handgun bullets, and within the military to stop high velocity fragments from explosions as well as bullets. Soft armor can also be used for "non-personal" ballistic resistance, such as for covering the walls and floor of vehicles. In such "bomb-blanket" end-uses it can be desirable to have a flexible, foldable material that can stop fragments from bombs and other explosive devices.

Soft armor can include a stack of stitched together layers of woven fabric, without resin. If a resin matrix is used, i.e., soft unidirectional fabrics, the high-performance fiber is combined with a relatively weak and flexible polymer, elastic in nature, to bind the high performance fibers together without severely limiting conformability.

Hard armor, fiber-reinforced composites on the other hand, are made from high performance fibers combined with a rigid or semi-rigid resin matrix to create a solid ballistic resistant material. The fabrication of hard armor can involve consolidation of individual fabric or orthogonal fabric layers into a bonded armor system using heat and pressure. The consolidation can require a heated press, autoclave, vacuum table, or heated vacuum oven, although other fabrication techniques may be possible, including, but not limited to, room temperature cure epoxies or ultraviolet curable resins.

Rigid composite armor is commonly used in ballistic end-uses such as military and police helmets, military vehicles (both as spall liners behind steel within the vehicles and as add-on applique armor in combination with ceramic and steel on outside of the vehicles), hand-held riot shields, helicopter armor, military cargo planes, civilian vehicles, and personal protective ballistic inserts. For ballistic inserts used by the police, law enforcement agencies and the military, the hard fiber-reinforced composite material can be used behind ceramic (e.g., aluminum oxide, silicon carbide, and boron carbide) to create a lightweight, ceramic-faced composite armor capable of defeating a wide range of armor-piercing rifle threats.

Rigid or "semi-rigid" composites are generally not deformable such that the shape cannot readily be altered by relative flexural movement of the fibers or filaments along their axes, as the fibers or filaments are held in place by the resin. Generally, the term "rigid" can be used to refer to composites made using thermosetting resin, while "semi-rigid" may refer to composites made using thermoplastic resins and/or a low resin content of thermosetting resin. The ballistic composite armor article 20 disclosed herein is a rigid or semi-rigid composite armor.

FIG. 1 illustrates an example of the ballistic composite armor article 20. In the view shown, the various layers of the article 20 are expanded apart for the purpose of describing the structure of the article. It is to be understood that the various layers are in fact bonded together such that the article 20 is a unified structure.

The article 20 includes a multi-layer hard armor sheet 22 including at least first and second unidirectional yarn monolayers 24/26. The second unidirectional yarn monolayer 26 is transversely oriented with respect to the first unidirectional yarn monolayer 24. In this example, the first and second unidirectional yarn monolayers 24/26 have a relative 0°/90° construction, although other angles are also contemplated. In further examples, additional unidirectional yarn monolayers can also be used to provide a 0°/90°/0°/90° construction. In yet further examples, additional unidirectional yarn monolayers can be used to provide constructions with 45°/−45° unidirectional yarn monolayers.

At least one polymeric binder layer 28, which may also be referred to herein as resin, dry resin, polymeric binder, or variations thereof, is arranged adjacent to and stabilizes at least one of the first and second unidirectional yarn monolayers 24/26. Each of the first and second unidirectional yarn monolayers 24/26 includes a unidirectional array of yarns 30 that are arranged nominally parallel to one another in their respective first and second unidirectional yarn monolayers 24/26. The composition of the polymeric binder layer or layers 28 can be selected with respect to the composition of the yarns 30 to obtain good ballistic performance. As examples, the polymeric binder layer or layers 28 are generally thermoplastic or thermoset polymer materials.

In the illustrated example, there are three polymeric binder layers 28a/28b/28c. The first polymeric binder layer 28a is a distinct layer between the first and second unidirectional yarn monolayers 24/26, and the second and third binder layers 28b/28c are distinct layers arranged at the respective opposite faces of the first and second unidirectional yarn monolayers 24/26 from the first polymeric binder layer 28a. In one example, the term "distinct" refers to the layer being visually discernible, with the naked eye or under low power magnification. The first polymeric binder layer 28a and the second polymeric binder layer 28b thus "sandwich" the first unidirectional yarn monolayer 24, and the first polymeric binder layer 28a and the third polymeric binder layer 28c thus "sandwich" the second unidirectional yarn monolayer 26. The number of polymeric binder layers 28 can be varied with the number of unidirectional yarn monolayers used. In general, each unidirectional yarn monolayers will be "sandwiched" between at least two polymeric binder layers, although it is also contemplated that multiple unidirectional yarn monolayers could be serially stacked without an interleaving polymeric binder layer and/or that multiple polymeric binder layers could be serially stacked without an interleaving unidirectional yarn monolayer.

In a further example, the first polymeric binder layer 28a has a higher areal density than each of the second and third polymeric binder layers 28b/28c, which can facilitate increasing the polymer binder content and thus the lowering the relative volume fraction and weight of the yarns 30. In the examples herein, the multi-layer hard armor sheet 22 has, by weight, 20%-50% of the polymeric binder 28.

Figure 2:
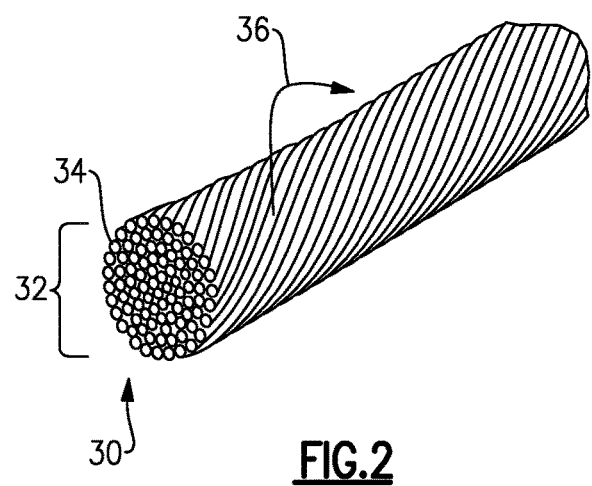
FIG. 2 illustrates an example yarn.

FIG. 2 shows a representative yarn 30, which includes a bundle 32 of fibers 34 (collectively a fiber bundle), which can also be referred to as filaments. In this example, the bundle 32 is shown with axial twist, represented at 36. The amount of axial twist shown may be exaggerated for purposes of this description. In one example however, the yarns 30 of the first and second unidirectional yarn monolayers 24/26 have an axial twist of 0.5 turns per meter or greater, up to less than 20 turns per meter. In a further example, the yarns 30 of the first and second unidirectional yarn monolayers 24/26 have an axial twist of 0.5 turns per meter to 4 turns per meter, or an axial twist of 0.5 turns per meter to 1.25 turns per meter.

Yarns used in ballistic articles are "spread" or "expanded" from a nominally circular cross-sectional shape to an oblong shape for incorporation into ballistic articles. Spreading can occur when the yarn is subjected to a tension, and particularly when tensioned over a roller or curved surface, for example. The normal objective in ballistic articles is to highly spread the yarns such that the individual fibers have a maximum degree of parallelism with one another, to enhance ballistic properties. For a given fiber diameter (D), ideal spreading would provide a spread monolayer thickness of D. In practice however, the ideal is impossible to achieve because of yarn overlap, yarn entanglement, and limits on tensioning that would otherwise degrade yarn or fiber properties. Consequently, practical restrictions dictate a limited objective of spreading as much as possible without creating web-defects, or damaging yarns. Yarns are thus normally spread at a spread factor of more than 500%. The spread factor is the relative difference, by percentage, between a nominally circular cross-section yarn and, after spreading, the dimension of the yarn in the spread direction.

Contrary to the normal objective of spreading "as much as possible" in ballistic articles, the objective in the present disclosure is to have the yarns 30 in the multi-layer hard armor sheet 22 of the article 20 have little or no spreading. In this regard, the bundles 32 of the yarns 30 of the first and second unidirectional yarn monolayers 24/26 have a lateral spread factor (lateral in a direction perpendicular to the yarn long axis, in the plane of the monolayer), which may also be referred to herein as spread or variations thereof, ranging from negative lateral spread to a positive lateral spread of less than 306%. Table 1 below illustrates theoretical yarn spreading calculations. The calculations are specific to 3000 denier aramid with a specific gravity of 1.44 g/cm$^3$, and will vary proportionally for other yarns with respect to yarn denier and specific gravity.

A negative lateral spread factor implies that a yarn bundle 32 that has a nominally circular cross-section is distorted into an approximately square cross-section to allow for the tighter packing of the individual fibers 34. For example, a spread factor of −11% for aramid, and similar density high tenacity yarns, implies that all the yarn bundles are as densely packed together as possible without any yarn overlap, or the yarn bundle is laterally narrower than it is high. A spread factor of −29% for glass, and similar density high-tenacity yarns, implies that all the yarn bundles are as densely packed together as possible without any yarn overlap, or the yarn bundle is laterally narrower than it is high.

A spread factor, or percent yarn spread, can be calculated from a measured areal density of a fiber monolayer within an orthogonal fabric and the number of ends per unit distance (e.g., per inch) of a yarn, of a set denier (i.e., linear density) needed to achieve this areal density. If the calculated number of ends per unit length is higher than the number of parallel circular yarns of a given set denier and density that theoretically can be physically be laid side-by-side, then the spread factor is negative and it can be assumed that the yarns are overlapping each other or being distorted into a non-circular shape.

Hence, a spread factor −11% (for aramid and similar density high-tenacity yarns) implies that all the yarn bundles of each of, for example, the unidirectional yarn monolayers 24/26, are either as densely packed together as possible without any yarn overlap, or that the yarn bundles 32 are spread to some degree but, then are overlapping or stacked on top of each other to achieve the high areal density. However, the degree of overlapping in a unidirectional monolayer, such as either of unidirectional yarn monolayers 24/26, is, as a percentage of the number of overlapping yarns 30 versus the total number of yarns, relatively small. In this regard, the overlapping of a small number of yarns 30 in calculation of the spread factor of a unidirectional monolayer is distinguished, both conceptually and physically, from two monolayers that are cross-stacked directly on top of one another, in that in the structure of two stacked monolayers, all of the yarns of one monolayer overlap the yarns of the other monolayer. In this sense, the presence of overlapping yarns in either of the unidirectional yarn monolayers 24/26 does not equate the individual unidirectional yarn monolayers 24/26 to two stacked monolayers.

The ability of a yarn to spread can be influenced by at least several factors, such as degree of individual yarn filament entanglement in the yarn bundle, frictional forces between yarn filaments, the actual number of yarn filaments, and denier of the yarn filaments within the yarn bundle. Hence, a 3000 denier yarn with 1.5 dpf (denier per filament) yarn filaments would spread differently than say a 1500 denier yarn with 1.5 dpf. Similarly, a 3000 denier yarn with 1.0 dpf, would theoretically spread differently than one with 1.5 dpf, as the yarn would be made up of an extra 1000 yarn filaments.

TABLE #1

Theoretical Yarn spreading calculations for 3000 denier Aramid yarns
(and similar organic high tenacity yarns) in a UD-monolayer:

| Description of Aramid 0° UD monolayer (used to make orthogonal fabric) | Mono layer Areal Density (g/m2) | Ends/inch | # of Yarns per meter | Average Yarn width (mm) | % Yarn Spread (from a perfect circle) |
|---|---|---|---|---|---|
| Densely compacted yarn (square cross section), Theoretical max yarn areal density | 540 | 41.18 | 1621 | 0.62 | −11% |
| Densely packed parallel yarns bundles (as perfect circles) max 36.5 ends/inch | 479 | 36.5 | 1437 | 0.70 | 0% |
| *Industry Style 745 plain woven fabric ~ 17 ends/inch (*woven - not orthogonal)~93% cover | 223 | 17 | 669 | 1.49 | 115% |
| High Density, High Dry-Resin Content Orthogonal Fabric (HD HDRC Orthogonal Fabric) | 220 | 16 | 630 | 1.59 | 128% |
| Proposed 'max spread' HD HDRC Mono-layer yarn (aramid) | 128 | 9 | 354 | 2.82 | 306% |
| Heaviest known areal density "commercial" UD fabric = Honeywell's Gold Shield GV-2016 (3000 denier aramid) | 115 | 8.8 | 346 | 2.89 | 315% |
|  | 110 | 8.4 | 331 | 3.02 | 335% |
| Heavy Weight Commercial UD fabric - T1000 3000 den aramid | 107 | 8.15 | 321 | 3.12 | 348% |
| Light weight commerical UD fabric, highly spread yarn (3000 den aramid) | 48 | 3.65 | 144 | 6.96 | 900% |

As a result, the first and second unidirectional yarn monolayers 24/26 have individual thicknesses of 11D to 51D with respect to the individual fiber diameter D. In further examples, the individual thicknesses can be 20D to 40D for inorganic compositions of the fibers 34, or 13D to 23D if organic compositions of the fibers 34 are used.

The composition of the fibers 34 can be selected in accordance with ballistic performance and other performance factors. For example only, the fibers 34 can be aramid fibers, para-aramid fibers, polyolefin fibers, polyamide fibers, poly-p-phenylenebenzobisoxazole (PBO) fibers, liquid crystal polymer fibers, aromatic polyester fibers, carbon fibers, glass fibers, or basalt fibers, but are not limited to these. Similar density organic yarns can also be used, such as, but not limited to, organic yarn with a specific gravity of 0.70 to 1.8.

In further examples where the fibers 34 are inorganic fibers, the lateral spread factor ranges from −30% to 35%. Inorganic high-tenacity yarns, such as S-glass, E-glass and basalt, have a much higher density than organic yarns (e.g., 2.45 g/cm$^3$ for S-glass versus 1.44 g/cm$^3$ for aramid) and by their very nature are more brittle and difficult to spread without damaging their fine yarn filaments. Similar density inorganic yarns can also be used, such as, but not limited to, inorganic yarns with a specific gravity of 1.8 to 2.8. The use of a spread factor of −30% to less than 35% helps to limit fiber damage and contribute to maintaining good fiber properties and ballistic performance. Table 2 below illustrates theoretical yarn spreading calculations for a glass yarn. The calculations are specific to 3620 dtex S-Glass with a specific gravity of 2.45 g/cm$^3$ and will vary proportionally for other yarns with respect to yarn denier and specific gravity.

TABLE #2

Theoretical Yarn spreading calculations for 3620 dtex S-glass yarns
(and similar inorganic high-tenacity yarns) in a UD-monolayer:

| Descritption of S-Glass 0° UD monolayer (used to make orthogonal fabric) | Mono layer Areal Density (g/m2) | Ends/inch | # of Yarns per meter | Average Yarn width (mm) | % Yarn Spread (from a perfect circle) |
|---|---|---|---|---|---|
| Densely compacted yarn (square cross section), Theoretical max yarn areal density | 731 | 51.3 | 2020 | 0.50 | −29% |
| Densely packed parallel yarns bundles (as perfet circles) max 45.5 ends/inch | 648 | 45.5 | 1791 | 0.56 | 0% |
| *Mil-DTL-6415B Specification (Class C) ~ 29 ends/inch (*woven - not orthogonal) | 413 | 29 | 1142 | 0.88 | 26% |
| High Density, High Dry-Resin Content Orthogonal Fabric (HD HDRC Othogonal Fabric) | 419 | 29.4 | 1157 | 0.86 | 24% |
| Proposed 'max spread' of HD HDRC Mono-layer yarn (inorgaic yarn) | 385 | 27 | 1063 | 0.94 | 35% |

The ballistic composite armor article 20 according to this disclosure can enhance composite ballistic armor systems (e.g., lighter, better ballistic performance, less expensive) in at least several ways.

For example, a ballistic composite armor article 20 according to this disclosure, which may also be referred to in various instances or in data presented herein as a high density, high dry-resin content orthogonal fabric ("HD HDRC orthogonal fabric") can be fabricated by making an ultra-dense, high areal density orthogonal fabric, where the fiber-only areal density of each monolayer 24/26 is increased by not significantly spreading the individual yarns 30. The low spread factor results in comparatively thick, high density monolayers 24/26 that are suitable for use as rigid or semi-rigid ballistic composites.

Additionally, the low spread factor of the yarns 30 of the monolayers 24/26 avoids the need for aggressive spreading processes under high tension, which would otherwise damage the fibers 34 and can reduce yarn tenacity by 5%-14%, or more. The low spread factor also allows for the ballistic composite armor article 20 to be made using a standard textile creel, commonly used for woven fabrics, that pulls the yarn off the end of the yarn packages, thus inducing yarn twist, instead of having to purchase expensive specialty creels that enable a high-tenacity yarn to be physically unrolled from the yarn packages. This type of creel requires careful tensioning of the individual yarn packages, in addition to the yarn after unwinding.

The low spread factor additionally allows for the ballistic composite armor article 20 to be made from yarn that cannot be produced without a material degree of axial twist. The manufacturing and winding of some types of yarn onto (or into a) yarn package, unavoidably leads to axial yarn twist, which would otherwise render the yarn unsuitable for unidirectional ballistic fabrics, since such fabrics require and utilize much higher spread factors. Examples of such yarns are S-glass and E-glass rovings that are formed into inside-pull packages without a cardboard core, and high-tenacity aromatic heterocyclic co-polyamide yarns, such as those under the tradenames Rusar® and Autex®, which go through a secondary annealing process that imparts a small amount of twist to the yarn.

While a high degree of axial twist is generally not desirable in the ballistic composite armor article 20, a relatively small amount of axial twist may be beneficial in keeping the monolayers 24/26 uniform, by reducing the amount of yarn fiber catenary, present due to relatively low web yarn tension. The examples herein can include an axial twist from 0.5 to 1.25 turns/meter, but should not exceed 20 turns/meter, and more preferably is below 4 turns/meter. The axial twist serves to bind the fibers 34 together to resist spreading if the yarn 30 is subjected to minor spreading forces during processing.

The ballistic composite armor article 20 can also provide improved composite ballistic armor systems (i.e., lighter, better ballistic performance, less expensive) by using considerably higher polymer binder 28 content in a 2-ply 0°/90° configuration or in a 4-ply 0°/90°/0°/90° configuration. For example, a low-cost (cost relative to the price of the high-performance ballistic yarn) polymer binder 28 can be used at dry resin content of 20% to 40% to decrease the material costs while achieving equal or better ballistic performance. Normally, there is a critical limit of fiber and polymer resin weight in which a ballistic composite must have greater than 80% fibers in order to maintain product integrity. If the percentage of resin, covers, and the like exceeds 20%, the ballistic performance degrades, which is set forth in U.S. Patent Application Publication 2005/0197020 to Park et al.

Thus, while high polymer binder 28 content used in this disclosure appears to be counter-intuitive according to experimental observations in soft armor systems, ballistic testing on the ballistic composite armor article 20 according to this disclosure were found to at least match the performance of, and in some cases significantly outperform, comparable rigid ballistic panels constructed out of comparison orthogonal fabric and woven ballistic fabric. Similar ballistic testing on ballistic composite armor article 20 using S-glass orthogonal fabric, in comparison to S-glass woven roving, further supported these findings.

The ballistic composite armor article 20 is less expensive to produce in comparison to traditional unidirectional systems. The process to make a dense unidirectional monolayer 24/26 is relatively simple and does not require expensive yarn tensioning or spreading equipment. The process can thus run at faster production rates, with less quality control mechanisms and process fine-tuning, since fiber uniformity and gaps between yarns across the product width due to its high density are not a significant concern.

The ballistic composite armor article 20 can also lower material costs due to the high dry-resin content. For example, if aramid ballistic fiber has a price range of US$12 to US$35 per pound (or US$26.50 to US$77 per kilogram) and a thermoplastic resin used for the polymer binder 28 has a price range of US$6 per pound (or US$13.23 per kilogram), using a larger percentage of polymer binder 28 will reduce cost.

The ballistic composite armor article 20 can additionally lower cost for rigid composite ballistic armor products on a per weight basis (i.e., cost per pound of armor basis) since its areal density is significantly higher than traditional unidirectional fabrics. Unidirectional fabrics can be sold per square yard (or square meter) basis. Composite ballistic armor, which is made from the unidirectional fabric, is however sold on a per pound basis. This means that all else being equal, a higher areal density unidirectional fabric per square meter will be more economical than a lighter areal density unidirectional fabric because fewer layers of the higher areal density unidirectional fabric will be needed to manufacture the armor. For example, given unidirectional Fabric A at 500 g/m$^2$ and a cost of $30 per square meter, and unidirectional Fabric B at 1000 g/m$^2$ and a cost of $45 per square meter, a 25 kg/m$^2$ areal density armor plate made out of Fabric A would result in an armor cost of $1500 per square meter (50 layers×$30 per square meter) while the same armor plate made out of Fabric B would have an armor cost of $1125 per square meter (25 layers×$45 per square meter). This is despite Fabric B being 50% more expensive per square meter than Fabric A.

In the above example, Fabric B would also be preferable to Fabric A as it would require half the precision cutting and lay-up costs necessary to make the pressed composite armor panel. This is because a panel made from unidirectional Fabric B would only require 25 layers of fabric versus the 50 layers of unidirectional fabric necessary to make a panel from Fabric A.

The method of fabricating the ballistic composite armor article 20 is also suited to glass rovings and glass armor since many of the yarns used to produce this armor (i.e., ShieldStrand S-glass roving) are only available as "inside wound packages" that impart a small amount of twist (~1.0 turn/meter) to the yarn during unwinding, which is not tolerable in highly spread orthogonal fabrics.

The method of fabricating the ballistic composite armor in article 20 can also be well suited to lower cost, regular tenacity, large dpf, high performance yarns (i.e., Kevlar 29 and Twaron T1000) versus using finer dpf, or higher tenacity yarns (i.e., Kevlar 129, Kevlar KM2, Twaron T2000). Using higher tenacity yarns would needlessly increase material costs without significantly increasing performance, which is again counter to what is observed in soft-armor unidirectional fabrics.

The ballistic composite armor article 20, pressed rigid composite armor panels, provides ballistic performance that matches or exceeds that of comparable woven or highly spread orthogonal fabrics made from the same input yarns. Without being bound to any particular theory, there may be several factors for this better-than-expected ballistic performance. For example, the low degree of yarn spreading in the ballistic composite armor article 20, which is critically important unidirectional fabrics for soft armor (i.e., unconsolidated body-armor applications) is not nearly as important for rigid composite ballistic armors, particularly against non-deformable threats. Testing seems to indicate that a high degree of yarn spreading has much less impact on the absorption and dissipation of energy in a composite panel in comparison to other factors such as yarn characteristics, the degree of yarn crimp, the denier per filament of the yarn, the rigidity of the composite armor panel, the degree of composite delamination during the ballistic event, frictional factors etc. This is opposite to what is typically observed when testing unidirectional fabric in soft armor applications, such as protective vests, where the degree of fiber spreading is proportional to the V50 ballistic limit of the armor.

In addition, the degree of yarn spreading may have more impact on deformable lead based ammunition (i.e., 9 mm and 0.44 Magnum hand gun rounds) than against hard non-deformable test projectiles such as fragment simulating projectiles (FSP's—called out in military specifications and meant so simulate the type of fragment being generated by a blast) or against armor piercing rounds that have first been shattered or blunted by a ceramic strike-face armor. Non-deformable threats are more typical of the threats rigid composite armor is used to protect against and tend to shear through the yarns in a unidirectional fabric based composite armor versus causing them to fail via tensile failure as the yarns elongate and break during the ballistic event. The high level of shear failure versus tensile failure may also explain why the densely-packed monolayers 24/26 may be more effective against an FSP round than a thin highly spread unidirectional mono-layer that the FSP would quickly shear through.

Another factor may be the specific properties of the polymer binder 28 selected. The binding resins may be selected based on their density, elongation and modulus properties but also on their specific compatibility and ballistic performance when tested in conjunction with a particular selected yarn 30. For example, thermoplastic ballistic resin that performs well on an organic p-aramid yarn typically does not perform well on an inorganic S-glass ballistic yarn. Further small differences in yarn spin finish, between different brands of para-aramid yarns may also influence ballistic performance due to how the binding resin interacts with the surface of the yarn. Based on this, an appropriate binding can be selected by looking at resin physical properties coupled with actual ballistic testing for high-performance ballistic yarn of choice. Generally, the polymer binder 28 can have, relative to the yarn 30, high elongation and low density. An additional consideration can be resin cost, such as a resin cost that is less than half the price of the high performance yarn being used, to significantly reduce the overall cost per pound of the final ballistic composite armor.

Further testing shows that ballistic composite armor article 20 can be made with 40% dry resin content while still maintaining good ballistic performance, with reference to comparable testing done against MIL-Spec fiber reinforced composite armor which exceeds that of published military armor specifications (e.g., MIL-DTL-64154B Laminate: Fiberglass-fabric-reinforced, phenolic), which may allow an armor manufacturer to reduce the total fiber-fraction-volume of a ballistic composite armor. Reducing fiber-fraction-volume will reduce the overall price of the composite and may give the ballistic composite better structural properties versus other resin-starved ballistic composite armors. The good performance of ballistic composite armor article 20 at these high dry-resin contents is unique in that an increase in dry resin content above 15% typically decreases ballistic performance on a per weight basis.

This been observed experimentally in aramid composite armors with respect to dry resin content. For aramid composite armors the ballistic performance of the panel (i.e., its V50 ballistic limit) is inversely proportional to the dry resin content, i.e., lower dry resin content increases the V50 ballistic limit until a critical point is reached (e.g., less than 5-15%, depending on the system) where the ballistic panels just break apart or delaminate excessively when impacted by a projectile due to insufficient resin.

Figure 3:
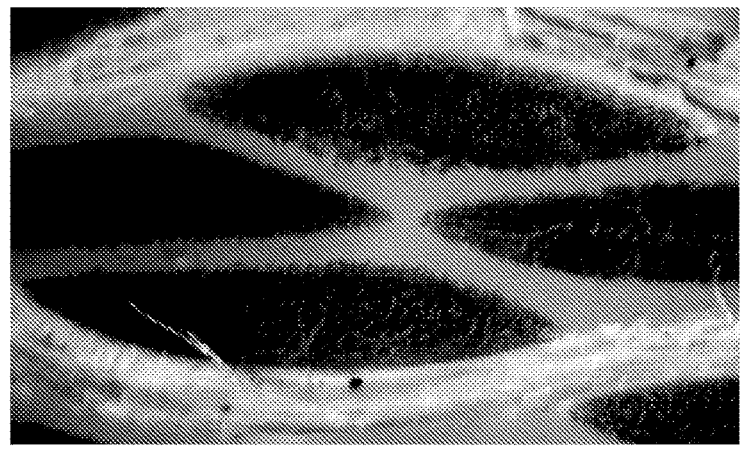
FIG. 3 illustrates an image of a cross-section of a comparison sample.
Figure 4A:
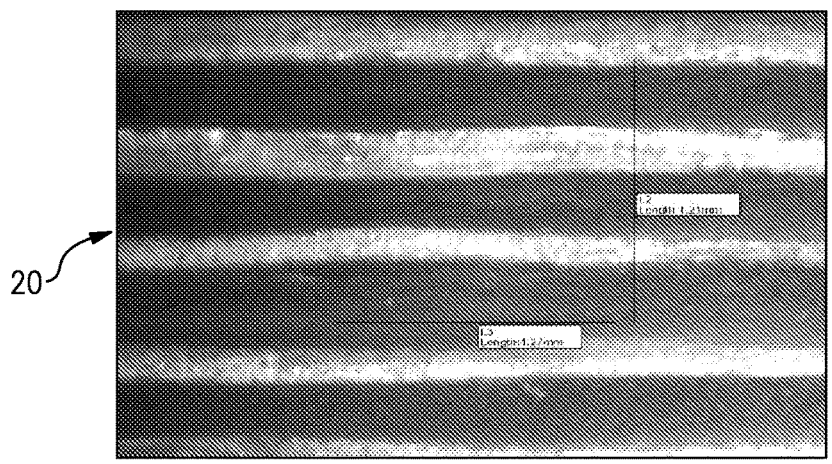
FIG. 4A illustrates an image of a cross-section of a sample ballistic composite armor article according to this disclosure.
Figure 5:
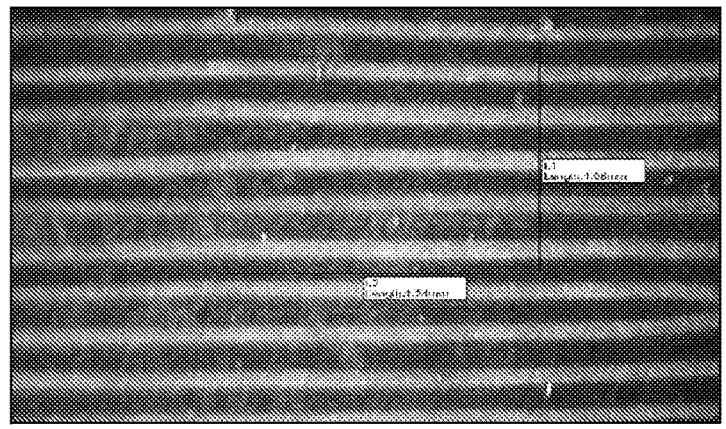
FIG. 5 illustrates an image of a cross-section of another comparison sample.
Figure 4B:
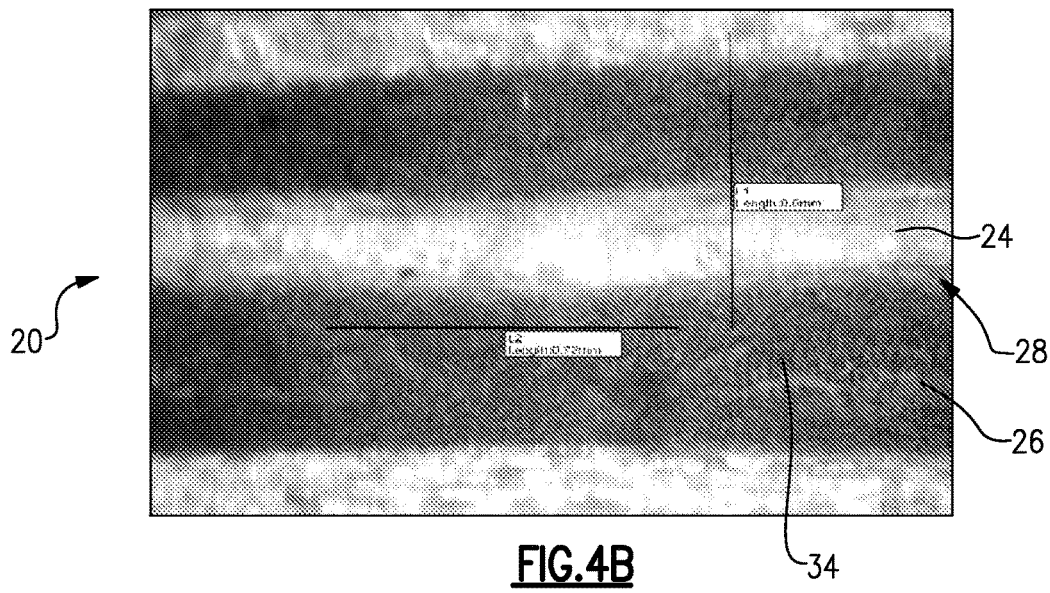
FIG. 4B illustrates a higher magnification image of the sample of FIG. 4A.

The high density, thick-layer construction of the ballistic composite armor article 20 may also prevent the polymer binder 28 from substantially penetrating into the yarn 30 or encapsulating the fibers 34. While some of the fibers 34 are in direct contact with the polymer binder 28 at the yarn 30 surfaces, significantly more of the fibers 34 in the ballistic composite armor article 20 are not in direct contact with the polymer binder 28 and are thus free to move and dissipate energy via tensile failure without being hindered by the relatively low modulus binding resin. For example, less than 20%, and preferably less than 11%, of the fibers 34 of the fiber bundles 32 are in contact with the polymeric binder 28. This can be seen, for example, in FIGS. 3-5 showing, respectively, magnified cross-sectional images of rigid composite ballistic panels each made of para-aramid, 3000 denier yarn, 1.5 denier per filament. The rigid composite ballistic panel of FIG. 3 was made from 2×2 basket weave p-aramid fabric (FIG. 3). An example of the ballistic composite armor article 20 is shown in FIG. 4A (lower magnification) and FIG. 4B (higher magnification) with a spread factor of about 128% and a monolayer thickness of about 17.8D. A relatively heavy weight, highly spread unidirectional construction is shown in FIG. 5, with a spread factor of about 348% and a monolayer thickness of about 8D.

The following describe additional examples.

EXAMPLE #1

To evaluate the ballistic performance of a low cost, 2-ply HD HDRC Orthogonal fabric (HD HDRC-2 ply), a comparison of ballistic performance was done versus various spread unidirectional fabrics with a dry resin content of about 15% to 17%. The HD HDRC Orthogonal fabric and the below samples were pressed into ballistic test panels at various areal densities for evaluation. The HD HDRC Orthogonal fabric was compared against:
  a. a spread but very heavy and high areal density 4-ply unidirectional fabric (Heavy-4 ply UD) made with 3000 den Twaron T1000 yarn with a highly flexible resin matrix; the fabric had a yarn spread of 315% and a thickness after pressing of ~8.3D and a total consolidated areal density of 552 g/m$^2$;
  b. a spread 2-ply unidirectional fabric (HS-2 ply UD) made with higher tenacity 3000 den Twaron T2000 yarn with a semi-rigid rubber resin matrix; this fabric had a yarn spread of 900% and a thickness after pressing of ~3.6D and a total consolidated areal density of 106 g/m$^2$;
  c. a spread rigid 2-ply unidirectional fabric (Rigid-2 ply UD) made with 3000 den Twaron T1000 yarn with a rigid cross-linked rubber matrix; this fabric had a yarn spread of 362% and a thickness after pressing of ~8.0D and a total consolidated areal density of 251.2 g/m².

Figure 6:
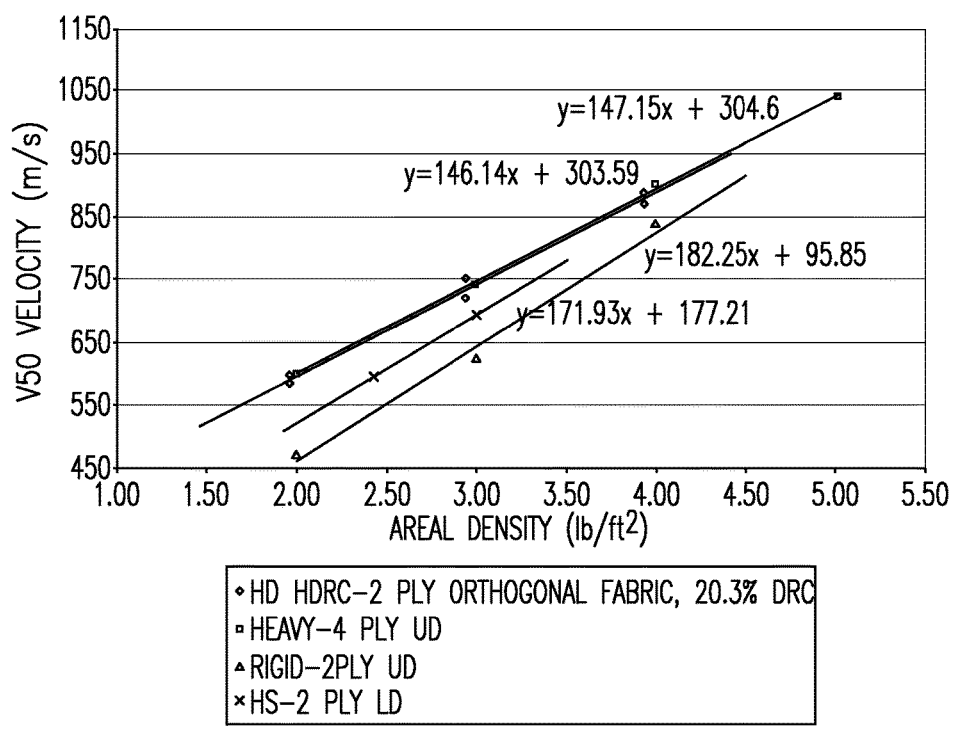
FIGS. 6-9 graphically illustrate ballistic testing results of a sample ballistic composite armor article according to this disclosure and comparison samples.

Ballistic limit (i.e., $V_{50}$) testing was done using 0.30 caliber fragment simulating projectiles (FSP'S) on each of the test panels made as per MIL-STD-662F. From the ballistic $V_{50}$ data, a ballistic performance curve was generated. This allowed for the comparison of the four armor systems across a variety of armor weights. The results are shown in FIG. 6, where the HD HDRC-2 ply Orthogonal fabric gave considerably better ballistics performance than both the 'HS-2 ply' UD fabric and the 'Rigid-2 ply' UD fabric and equivalent ballistic performance to the more expensive 'Heavy-4 ply' UD fabric. It is postulated that the Heavy-4 ply UD had higher than 'average' $V_{50}$ performance due to the very flexible resin system that had a high level of delamination during testing that would not be suitable for vehicle armor.

EXAMPLE #2

In this example, ballistic performance of the low cost, 2-ply HD HDRC Orthogonal fabric was compared against hard-armor unidirectional ballistic composite material, including Honeywell Gold Shield GV-2016, which is a 4-ply 0°/90°/0°/90° unidirectional fabric with an areal density of 510 g/m² and an assumed dry resin content of approximately 14%, giving a calculated areal density of the individual unidirectional monolayers of 127.5 g/m², a fiber areal density of approximately 110 g/m² and a calculated yarn spread factor of 335% with a thickness after pressing of about 8.13D. Both the HD HDRC Orthogonal fabric and the Gold Shield GV-2016 unidirectional fabric used in this example were produced with the same standard tenacity 3000 denier aramid yarn, thus making for a good ballistic comparison once pressed into ballistic test panels at various areal densities.

Figure 7:
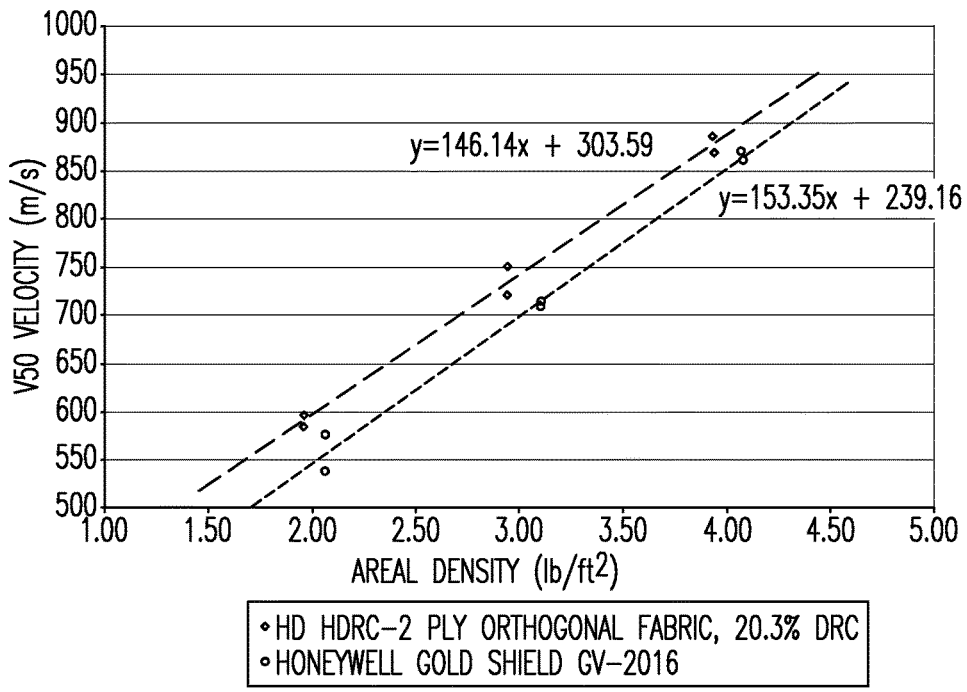

Ballistic limit (i.e. $V_{50}$) testing was done using 0.30 caliber fragment simulating projectiles (FSP'S) on each of the test panels made as per MIL-STD-662F. From the ballistic $V_{50}$ data, a ballistic performance curve was generated for both the 2-ply HD HDRC Orthogonal fabric and the Gold Shield GV-2016. This allowed for the comparison of the two armor systems across a variety of armor weights. The results are shown in FIG. 7, where the 2-ply HD HDRC Orthogonal fabric again gave considerably better ballistics performance than a theoretically more expensive to produce Gold Shield GV-2016 UD product. For example, at an areal density 3.0 psf the 2-ply HD HDRC Orthogonal fabric gave an average V50 performance of 742 m/s, while at an areal density 3.0 psf the Gold Shield GV-2016 had an average V50 performance of 699 m/s. This is a difference of 43 m/s, representing a 6.2% ballistic improvement or about a 10% weight advantage.

EXAMPLE #3

Next the ballistic performance of HD HDRC Orthogonal fabric was compared against a spread woven 3000 denier fabric which had be laminated with the same thermoplastic ballistic resin as the HD HDRC Orthogonal fabric. This testing was done to determine if the unexpectedly high ballistic performance of the HD HDRC Orthogonal fabric was solely due the ballistic resin system itself, or if the ballistic performance was also a function of crimp-free high-density unidirectional fabric construction. Theoretically, since the unidirectional fabric is crimp free, and the woven fabric has an approximate % crimp of 6-9%, the unidirectional fabric should have better ballistic performance. This is because unidirectional fabrics are more efficient at transferring the longitudinal strain waves of a ballistic event along fiber lengths. In woven fabric, the inefficient transfer of the longitudinal strain waves (due to crimp), in conjunction with the potential reflection of tensile waves within a woven fabric (due to yarn cross-overs), increases the total tensile load acting upon the yarn at a specific point, thereby prematurely breaking the yarn before the theoretical maximum amount of energy can be absorbed along its length.

The spread woven fabric that was evaluated was a 17×17 (ends and picks per inch), 3000 denier plain weave at an areal density of 450 g/m². This fabric was laminated with identical ballistic resin as the HD HDRC Orthogonal fabric, but at dry resin contents of 13% and 17%. A dry resin content of 13% was chosen because it theoretically would give the best ballistic performance once pressed. A dry resin content of 17% was selected to determine if this higher content would have a negative influence on the final ballistic composites performance on a per weight basis. The 3000 denier plain weave 17×17 fabrics, laminated with thermoplastic resin at both 13% DRC and 17% DRC, were then cut and pressed into rigid ballistic panels at the nominal areal densities of 2.0, 3.0 and 4.0 psf.

Figure 8:
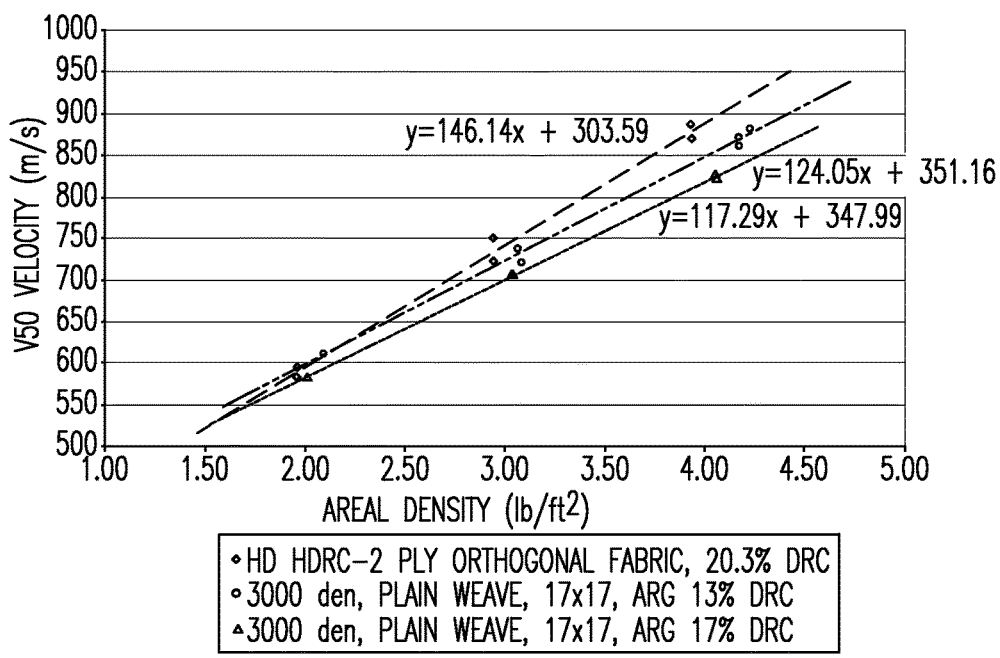

Ballistic limit (i.e. V50) testing was done using 0.30 caliber fragment simulating projectiles (FSP'S) on each of the test panels made as per MIL-STD-662F. From the ballistic V50 data, a ballistic performance curve was generated for both of the 3000 denier plain weave 17×17 fabrics, laminated with thermoplastic resin at both 13% DRC and 17% DRC, and these were compared to the ballistic performance curve of the HD HDRC Orthogonal fabric of Example #1. The results are shown in FIG. 8, where the HD HDRC Orthogonal fabric had a higher V50 ballistic limit than the plain woven fabric, particularly at higher areal densities. This is despite that fact it had a high DRC of 20%, or 7% less high-tenacity yarn than the 13% DRC ballistic panels constructed from the laminated plain weave 17×17 fabric. There was also a decrease in ballistic performance of 17% DRC ballistic panels relative to the 13% DRC panels. This clearly supports the known trend that an increase in the DRC above 15% correlates to a marked decrease in ballistic performance on a per weight basis. It also highlights the uniqueness of the HD HDRC orthogonal fabric construction given its superior ballistic performance at high dry-resin contents. The slope of the respective ballistic curves was also significantly different, with that of the unidirectional fabric being steeper than the two plain woven fabrics. This is typical when comparing the ballistics of crimped woven fabrics versus unidirectional crimp-free fabrics.

EXAMPLE #4

Next the ballistic performance of a low-cost 4-ply 0° /90° /0° /90° HD HDRC Orthogonal fabric (HD HDRC-4 ply), with an areal density of 1104 g/m2 was evaluated against Honeywell Gold Shield GV-2016 as in Example #2. Similar to the 2-ply HD HDRC orthogonal fabric, the yarn of HD HDRC-4 ply had a spread factor of 128% and a thickness after pressing of about 18.0D. The HD HDRC-4 ply UD fabric was pressed into two 3.0 psf ballistic test panels for evaluation, and ballistic limit (i.e. V50) testing was performed using 0.30 caliber fragment simulating projectiles (FSP'S) as per MIL-STD-662F.

Figure 9:
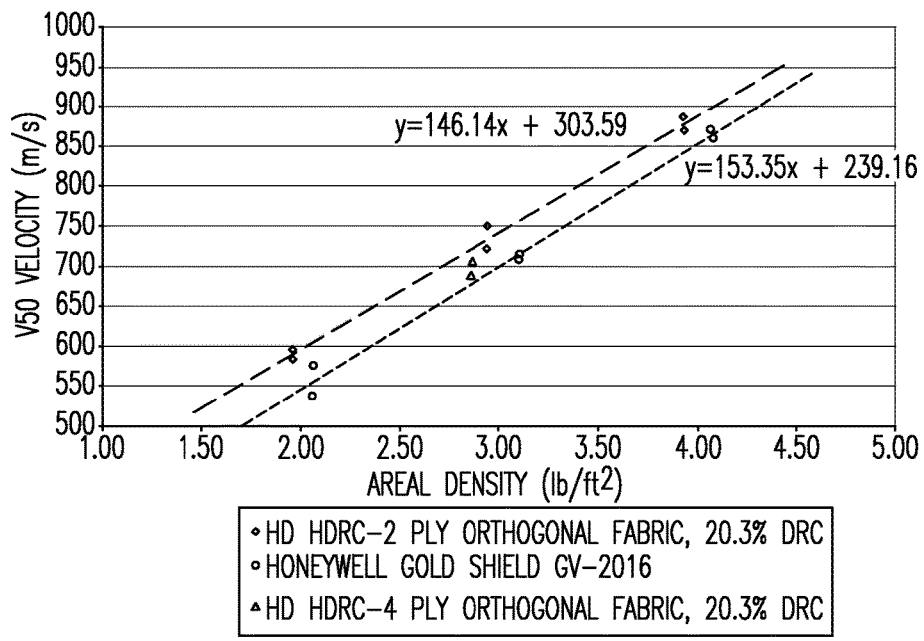

From the limited ballistic $V_{50}$ data generated, shown in FIG. 9, the HD HDRC-4 ply UD fabric did not perform as well as the 2-ply HD HDRC orthogonal fabric but still had equivalent or better ballistics than the theoretically more expensive to produce Gold Shield GV-2016. This may be because the non-standard lamination process used to make it.

EXAMPLE #5

Figure 10:
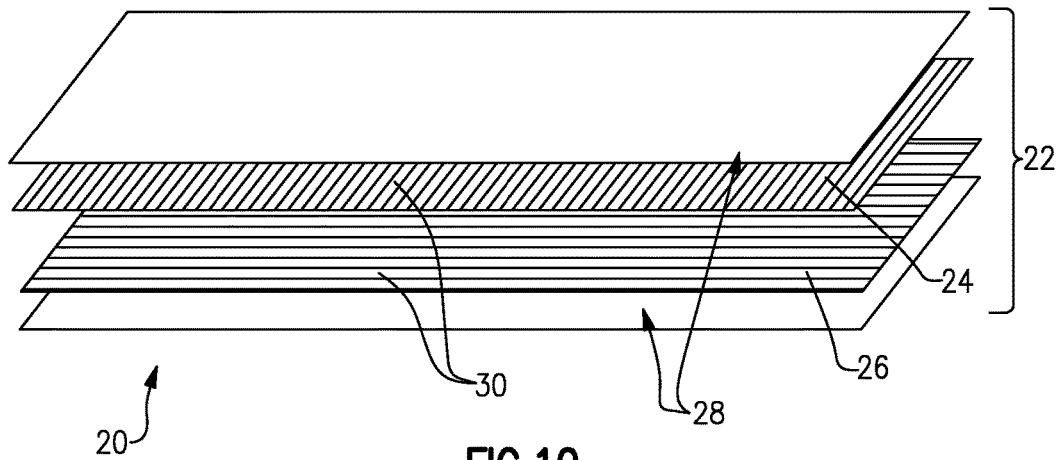
FIG. 10 illustrates another configuration of an example ballistic composite armor article according to this disclosure.

An HD HDRC orthogonal fabric made from inorganic S-glass roving was evaluated. A 2-ply 0°/90° configuration, similar to that shown in FIG. 1, was constructed using ShieldStrand S-Glass roving, except that no film or resin was used directly between the 0° monolayer and the 90° monolayer. The construction is shown in FIG. 10. The 0° and 90° monolayers were stabilized and bonded together by laminating thick thermoplastic films (each approximately 110 g/m$^2$) onto the unidirectional fiber webs, which under high heat and pressure, flowed enough to lightly bond the 0° monolayer and 90° monolayers together.

During fabrication the melting of the thermoplastic films under pressure minimally spread the 3620 dtex (3258 denier) S-Glass yarns in both the 0° and 90° monolayers. The spread factor was calculated to be 24% from a theoretical perfectly circular yarn bundle. The degree of yarn spreading in this example is noticeably less than in the aramid HD HDRC orthogonal fabric as the glass yarns were not laid side by side in parallel fashion, but rather were intentionally bundled together in groups of five to mimic a large assembled (5×3620 dtex) 18100 dtex glass roving. This means that some of the 3620 dtex yarns were actually stacked one on top of each other to help create a considerably thicker and denser (i.e. higher areal density) unidirectional monolayer. Even after pressing it was observed that the resin itself remained mostly on the top and bottom of the unidirectional webs with a minimal amount flowing between the top and bottom 0° and 90° glass webs, via small gaps in-between the mock '5-yarn 18100 dtex glass rovings'. It is believed that this weak resin starved bond between the 0° and 90° glass webs in the HD HDRC orthogonal fabric may have helped ballistic performance by allowing for energy absorption via controlled delamination. The resin itself was not observed to fully penetrate or encapsulate the individual yarn fibers of the S-glass yarns or rovings. The areal density of the 0° and 90° fiber only monolayers was 424 g/m$^2$, the total areal density was 1068 g/m$^2$ and the dry-resin-content was calculated to be 20.6%.

The thickness of the 2-ply HD HDRC orthogonal fabric after pressing at 35 psi at 340° F. for 40 minutes was calculated to be 0.562 mm. This means each 1-ply unidirectional monolayer had a thickness of 0.281 mm, or 31.2D. The diameter of the yarn filament in ShieldStrand S-Glass rovings is nominally 9×10$^{-6}$ mm.

Rigid composite ballistic panels were pressed using glass HD HDRC orthogonal fabric at 20%, 30% and 40% dry resin content, respectively. These panels were made by adding extra resin, in film form, to the 20% dry-resin content HD HDRC orthogonal fabric made above before pressing. All of the panels were made to a target areal density of 2.61 psf (12.74 kg/m$^2$) to allow for easy comparison. The ballistic results were also normalized to adjust for any small weight differences.

Figure 11:
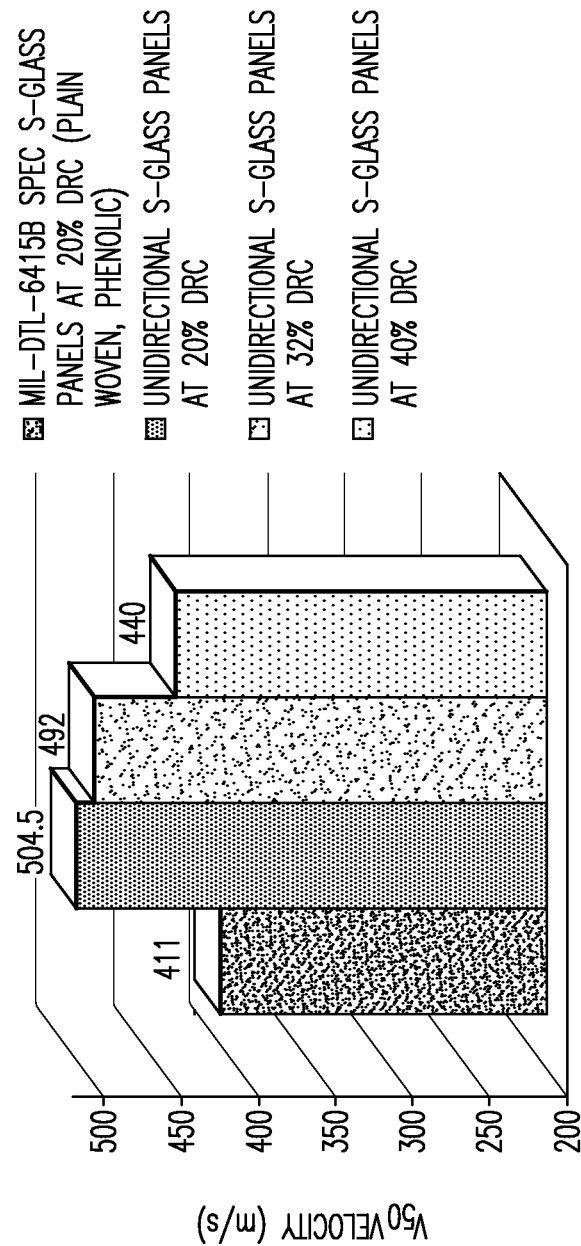
FIG. 11 graphically illustrates a ballistic testing result of a sample ballistic composite armor article according to this disclosure and comparison samples.

Ballistic limit (i.e. V50) testing was done using 0.30 caliber fragment simulating projectiles (FSP'S) on each of the test panels made as per MIL-STD-662F. From the ballistic V50 data, the performance of each of the different dry-resin content HD HDRC orthogonal fabrics could be compared to each other, as shown in FIG. 11. The performance of these HD HDRC orthogonal fabrics was also compared to that of pressed Mil-Spec (MIL-DTL-6415B Specification, Class C) S-Glass panels at 20% dry resin content. The plain woven S-Glass fabric used to make these panels had an areal density of 1060 g/m2, with a yarn spread factor of 26% and unidirectional monolayer thickness of 0.254 mm, or 28.2D.

The 2-ply glass HD HDRC orthogonal fabric gave considerably better ballistic performance than a comparable plain woven S-glass ballistic fabric. Also, increasing the dry resin content from 20%, all the way to 30%, had minimal detrimental effect on ballistic performance of the composite panel. At 40% DRC, the ballistic performance of the glass HD HDRC orthogonal fabric begins to noticeably drop, on a per weight basis. However, ballistic performance at 40% dry resin content is still superior to that of the Mil-Spec woven glass composite armor that has 20% more high-tenacity fiber content in the composite panel to absorb and dissipate energy.

At 20% dry resin content, 2-ply glass HD HDRC orthogonal fabric had an average $V_{50}$ performance of 93.5 m/s better than the Mil-Spec fabric, meaning it offers an improvement of approximately 23% over standard woven fabric.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A ballistic composite armor article comprising:
a multi-layer hard armor sheet including at least first and second unidirectional yarn monolayers, the second unidirectional yarn monolayer transversely oriented with respect to the first unidirectional yarn monolayer, and at least one polymeric binder layer arranged adjacent to and stabilizing at least one of the first and second unidirectional yarn monolayers, the yarns of the first and second unidirectional yarn monolayers including respective fiber bundles that have a lateral spread factor ranging from negative lateral spread to a positive lateral spread of less than 306%.

2. The ballistic composite armor article as recited in claim 1, wherein the multi-layer hard armor sheet has, by weight, 20%-50% of the polymeric binder.

3. The ballistic composite armor article as recited in claim 1, wherein the individual fibers of the fiber bundles have a diameter (D), and the first and second unidirectional yarn monolayers have respective thicknesses that are each greater than 11D.

4. The ballistic composite armor article as recited in claim 3, wherein the fibers are organic fibers and the respective thicknesses are 11D to 23D.

5. The ballistic composite armor article as recited in claim 3, wherein the fibers are inorganic fibers and the respective thicknesses are 20D to 40D.

6. The ballistic composite armor article as recited in claim 1, wherein the fibers are inorganic fibers and the lateral spread factor ranges from −30% to 35%.

7. The ballistic composite armor article as recited in claim 1, wherein the yarns of the first and second unidirectional yarn monolayers have an axial twist of 0.5 to less than 20 turns per meter.

8. The ballistic composite armor article as recited in claim 1, wherein the yarns of the first and second unidirectional yarn monolayers have an axial twist of 0.5-4 turns per meter.

9. The ballistic composite armor article as recited in claim 1, wherein less than 20% of the fibers of the fiber bundles are in contact with the at least one polymeric binder layer.

10. The ballistic composite armor article as recited in claim 1, wherein less than 11% of the fibers of the fiber bundles are in contact with the at least one polymeric binder layer.

11. The ballistic composite armor article as recited in claim 1, wherein the at least one polymeric binder layer includes at least one first distinct polymeric binder layer between the first and second unidirectional yarn monolayers, and second and third distinct polymeric binder layers arranged at the respective opposite faces of the first and second unidirectional yarn monolayers from the at least one first distinct polymeric binder layer.

12. The ballistic composite armor article as recited in claim 11, wherein the at least one first distinct polymeric binder layer has a higher areal density than each of the second and third distinct polymeric binder layers.

13. The ballistic composite armor article as recited in claim 1, wherein the fibers are organic fibers.

14. The ballistic composite armor article as recited in claim 1, wherein the fibers are inorganic fibers.

* * * * *